US010619088B2

(12) United States Patent
Nguyen et al.

(10) Patent No.: US 10,619,088 B2
(45) Date of Patent: Apr. 14, 2020

(54) FRACTURE HAVING A BOTTOM PORTION OF REDUCED PERMEABILITY AND A TOP PORTION HAVING A HIGHER PERMEABILITY

(71) Applicant: Halliburton Energy Services, Inc., Houston, TX (US)

(72) Inventors: Philip D. Nguyen, Houston, TX (US); Walter T. Stephens, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/554,202

(22) PCT Filed: Apr. 9, 2015

(86) PCT No.: PCT/US2015/025178
§ 371 (c)(1),
(2) Date: Aug. 28, 2017

(87) PCT Pub. No.: WO2016/164030
PCT Pub. Date: Oct. 13, 2016

(65) Prior Publication Data
US 2018/0030333 A1    Feb. 1, 2018

(51) Int. Cl.
*C09K 8/62* (2006.01)
*E21B 43/267* (2006.01)
(Continued)

(52) U.S. Cl.
CPC ............ *C09K 8/62* (2013.01); *C04B 28/02* (2013.01); *C09K 8/68* (2013.01); *C09K 8/805* (2013.01);
(Continued)

(58) Field of Classification Search
CPC ....... E21B 43/247; E21B 43/26; E21B 43/267
See application file for complete search history.

(56) References Cited

U.S. PATENT DOCUMENTS

| 3,126,056 A | * | 3/1964 | Harrell | E21B 43/267 166/280.1 |
| 3,127,937 A | * | 4/1964 | Kern | E21B 43/267 166/280.1 |

(Continued)

OTHER PUBLICATIONS

Society of Petroleum Engineers (SPE), SPE 49104, Waterfracs—Results from 50 Cotton Valley Wells, pp. 489-496, 1998.
(Continued)

*Primary Examiner* — Matthew R Buck
*Assistant Examiner* — Aaron L Lembo
(74) *Attorney, Agent, or Firm* — McGuireWoods, LLP.

(57) ABSTRACT

A method of fracturing a subterranean formation comprising: introducing a fracturing fluid into the subterranean formation to create or enhance a fracture comprising a bottom and top portion; introducing a first treatment fluid into the fracture, wherein after introduction of the first treatment fluid, at least a portion of the first treatment fluid remains in the bottom portion; and simultaneously introducing a second and third treatment fluid into the fracture after introduction of the first treatment fluid, wherein after introduction of the second and third treatment fluids, at least a portion of the second treatment fluid remains in the top portion, wherein after introduction of the first, second, and third treatment fluids, the bottom portion of the fracture has a first permeability and the top portion of the fracture has a second permeability that is greater than the first permeability. The first treatment fluid can create or enhance the fracture.

23 Claims, 3 Drawing Sheets

(51) Int. Cl.
*E21B 43/26* (2006.01)
*C09K 8/80* (2006.01)
*C04B 28/02* (2006.01)
*C09K 8/88* (2006.01)
*C09K 8/68* (2006.01)
*E21B 43/247* (2006.01)

(52) U.S. Cl.
CPC .............. *C09K 8/88* (2013.01); *E21B 43/247* (2013.01); *E21B 43/26* (2013.01); *E21B 43/267* (2013.01); *C09K 2208/24* (2013.01); *C09K 2208/26* (2013.01)

(56) References Cited

U.S. PATENT DOCUMENTS

| | | | | |
|---|---|---|---|---|
| 3,155,159 | A | * | 11/1964 | Kieschnick, Jr. ..... E21B 43/267 166/280.1 |
| 3,224,506 | A | * | 12/1965 | Huitt ..................... E21B 43/267 166/223 |
| 4,078,609 | A | | 3/1978 | Pavlich |
| 4,887,670 | A | | 12/1989 | Lord et al. |
| 5,159,979 | A | | 11/1992 | Jennings, Jr. |
| 5,425,421 | A | * | 6/1995 | Coleman ................ C09K 8/512 166/250.14 |
| 7,281,581 | B2 | | 10/2007 | Nguyen et al. |
| 7,581,590 | B2 | | 9/2009 | Lesko et al. |
| 7,918,277 | B2 | | 4/2011 | Brannon et al. |
| 7,931,084 | B2 | | 4/2011 | Nguyen et al. |
| 8,066,068 | B2 | | 11/2011 | Lesko et al. |
| 2008/0149329 | A1 | * | 6/2008 | Cooper ................ E21B 43/267 166/250.01 |
| 2011/0036571 | A1 | | 2/2011 | Vitalievich et al. |
| 2014/0060826 | A1 | * | 3/2014 | Nguyen ................ E21B 43/267 166/280.1 |
| 2014/0262231 | A1 | * | 9/2014 | Alam ...................... C09K 8/72 166/250.01 |

OTHER PUBLICATIONS

Society of Petroleum Engineers (SPE), SPE 108089, Extrapolation of Laboratory Preppant Placement Behavior to the field in Slickwater Fracturing Applications, pp. 1-12, 2007.
Society of Petroleum Engineers (SPE); SPE 114173, Stmulating Unconventional Reservoirs; Maximizing Ntetwork Growth while Optimizing Fracture Conductivity, pp. 1-19, 2008.
Society of Petroleum Engineers (SPE), SPE 119350, Stress Amplification and Arch Dimensions in Proppant Beds Deposited by Waterfracs, pp. 1-17, 2009.
Society of Petroleum Engineers (SPE), SPE 119368, The Effect of Proppent Distribution and Un-Propped Fracture Conductivity on Well Performance in Unconventonal Gas Reservoirs, pp. 1-10, 2009.
Society of Petroleum Engineers (SPE), SPE 168996, Development and Field Applications of Highly Conductive Proppant-free Channel Fracturing Method, pp. 1-16, 2014.
Society of Petroleum Engineers (SPE), SPE 171221-MS, Use of Channel Fracturing Technology Increases Production and Reduces Risks in Horizontal Wellbore Completions. First Experience in Russia, South-Priabskoe Oil Field, pp. 1-14, 2014.
Patent Cooperation Treaty, International Search Report and Written Opinion, PCT Appln. PCT/US2015/025178, dated Dec. 1, 2015.
Office Action dated Jun. 14, 2019 in U.S. Appl. No. 15/560,263.

* cited by examiner

FRACTURE HAVING A BOTTOM PORTION OF REDUCED PERMEABILITY AND A TOP PORTION HAVING A HIGHER PERMEABILITY

TECHNICAL FIELD

Hydraulic fracturing operations can be used to stimulate production of a reservoir fluid. Proppant is commonly placed within the fractures to prop the fracture open. A low permeability material can be placed in a bottom portion of the fracture, while a higher permeability material can be placed in a top portion of the fracture. A reservoir fluid can be more easily produced through the top portion of the fracture.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
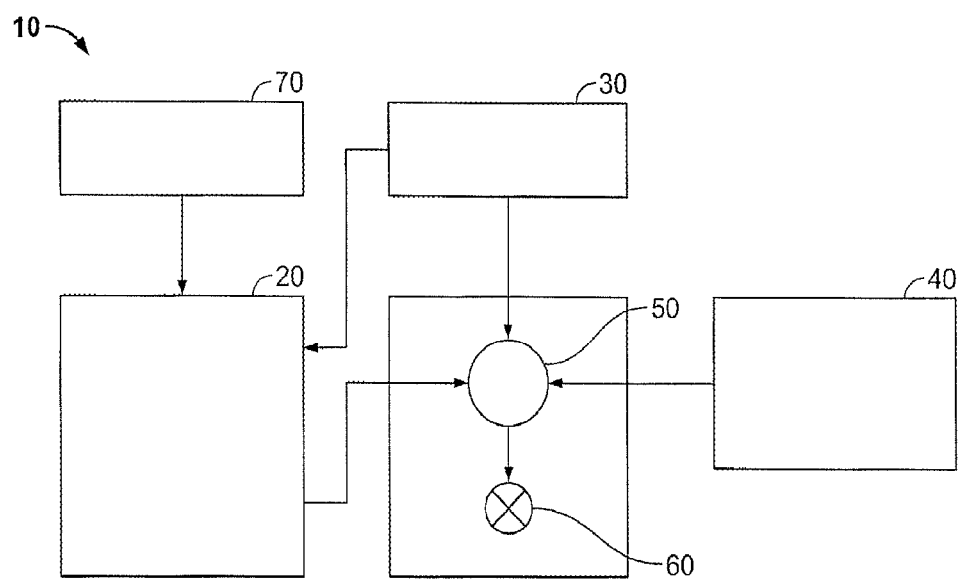
FIG. 1 is a diagram illustrating a fracturing system according to certain embodiments.

Oil and gas hydrocarbons are naturally occurring in some subterranean formations. In the oil and gas industry, a subterranean formation containing oil or gas is referred to as a reservoir. A reservoir may be located under land or offshore. Reservoirs are typically located in the range of a few hundred feet (shallow reservoirs) to tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71 OF (22° C.) and a pressure of 1 atmosphere (atm) (0.1 megapascals (MPa)). A fluid can be a liquid or gas. A homogenous fluid has only one phase, whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation, including into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

After a wellbore is drilled, it may often be necessary to fracture the subterranean formation to enhance hydrocarbon production. A fracturing fluid, often called a pad fluid, is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. As used herein, the term "fracture" means the creation or enhancement of a natural fracture using a fracturing fluid and can be referred to as "man-made." Fracturing a subterranean formation typically requires hundreds of thousands of gallons of fracturing fluid. Further, it is often desirable to fracture at more than one downhole location. Therefore, the base fluid of a fracturing fluid is usually water or water-based for various reasons, including the ready availability of water and the relatively low cost of water compared to other liquids.

The newly created or enhanced fracture will tend to close together after pumping of the fracturing fluid has stopped due to the weight of the subterranean formation. To prevent the fracture from closing, a material must be placed in the fracture to keep the fracture propped open. A material used for this purpose is often referred to as a "proppant." The proppant is in the form of solid particles, which can be suspended in the fracturing fluid, carried downhole, and deposited in the fracture as a "proppant pack." The proppant pack generally props the fracture in an open position while allowing fluid flow through the permeability of the pack.

Proppant materials generally include silicon dioxide, nut shells, sintered bauxite, glass, plastics, ceramic materials, and any combination thereof in any proportion. The proppant is an appropriate size to prop open the fracture and allow fluid to flow through the proppant pack; that is, in between and around the proppant making up the pack. Appropriate sizes of particulate for use as a proppant are typically in the range from about 8 to about 100 U.S. standard mesh. A typical proppant is sand-sized, which geologically is defined as having a largest dimension ranging from 0.0625 millimeters up to 3 millimeters.

The subterranean formation will exert a force or pressure on the proppant located within the fracture. This is known as the closure stress of the formation or fracture. The proppant is generally sufficiently strong; that is, has a sufficient compressive or crush resistance to prop the fracture open without being deformed or crushed by the closure stress of the fracture. Pressures from the subterranean formation on the proppant located in the fractures can be as high as 10,000 to 15,000 or more pounds force per square inch (psi). If a proppant material crushes under closure stress, then the fracture will close and no longer function to provide a less restrictive fluid flow path for production of reservoir fluids. As such, proppant generally has a crush resistance, which is measured as at least 90% to 95% of the proppant does not crush under the closure stress of the formation and functions to keep the fracture in an open position. Accordingly, only about 5% to 10% of the proppant may crush under the closure stress. The proppant must generally be a high-quality proppant and the size and shape of the proppant are selected to provide the desired crush resistance.

The conductivity of the fracture (i.e., the flow rate of fluid through the fracture) and the duration of the conductivity is related to the quality of the proppant, the size of the proppant, and the placement of the proppant within the fracture. In order to increase the conductivity and conductivity life, higher-quality proppant is commonly used. Moreover, the same amount of permeability throughout the entire fracture is desired. For example, the proppant is ideally placed within the fracture such that the top part of the fracture has approximately the same amount of permeability as the bottom part of the fracture. As a result, proppant pack operations are commonly designed to provide a relatively uniform distribution of proppant to form the proppant pack. This means that large quantities of proppant may need to be used to provide the uniform permeability via placement of the proppant, which can be quite costly. Thus, there is a need and ongoing industry-wide interest in methods of producing a reservoir fluid through a fracture.

It has been discovered that the conductivity of a fracture can be increased by forming a bottom portion of the fracture with a very low to no permeability and a top portion with a higher permeability compared to the bottom portion. For a fracture having the same dimensions, the novel methods increase the conductivity and/or the conductivity life of the fracture compared to conventional methods. A first fluid can be introduced into the bottom portion of the fracture and one or more fluids can be subsequently introduced into the top portion. One of the main differences between the novel methods and conventional techniques is that the novel methods produce a bottom portion having little to no permeability, unlike conventional methods that desire a higher permeability in all areas of the fracture. Additionally, lower-quality proppant and a lower quantity can be used, which can reduce costs.

According to certain embodiments, a well system comprises: a subterranean formation penetrated by a wellbore; and a fracture located within the subterranean formation, wherein the fracture comprises: a bottom portion having a first permeability; and a top portion having a second permeability, wherein the first permeability is less than the second permeability.

According to certain other embodiments, a method of fracturing a subterranean formation comprises: introducing a fracturing fluid into the subterranean formation, wherein the introduction of the fracturing fluid creates or enhances a fracture in the subterranean formation, and wherein the fracture comprises a bottom portion and a top portion; introducing a first treatment fluid into the fracture after introduction of the fracturing fluid, wherein after introduction of the first treatment fluid, at least a portion of the first treatment fluid remains in the bottom portion of the fracture; and simultaneously introducing a second treatment fluid and a third treatment fluid into the fracture after introduction of the first treatment fluid, wherein after introduction of the second and third treatment fluids, at least a portion of the second treatment fluid remains in the top portion of the fracture, wherein after introduction of the first, second, and third treatment fluids, the bottom portion of the fracture has a first permeability and the top portion of the fracture has a second permeability, and wherein the first permeability is less than the second permeability.

According to certain other embodiments, the first treatment fluid can be used to create or enhance the fracture in the subterranean formation.

The discussion of preferred embodiments regarding the treatment fluid or any ingredient in the treatment fluid is intended to apply to all of the system and method embodiments. Any reference to the unit "gallons" means U.S. gallons.

Figure 2:
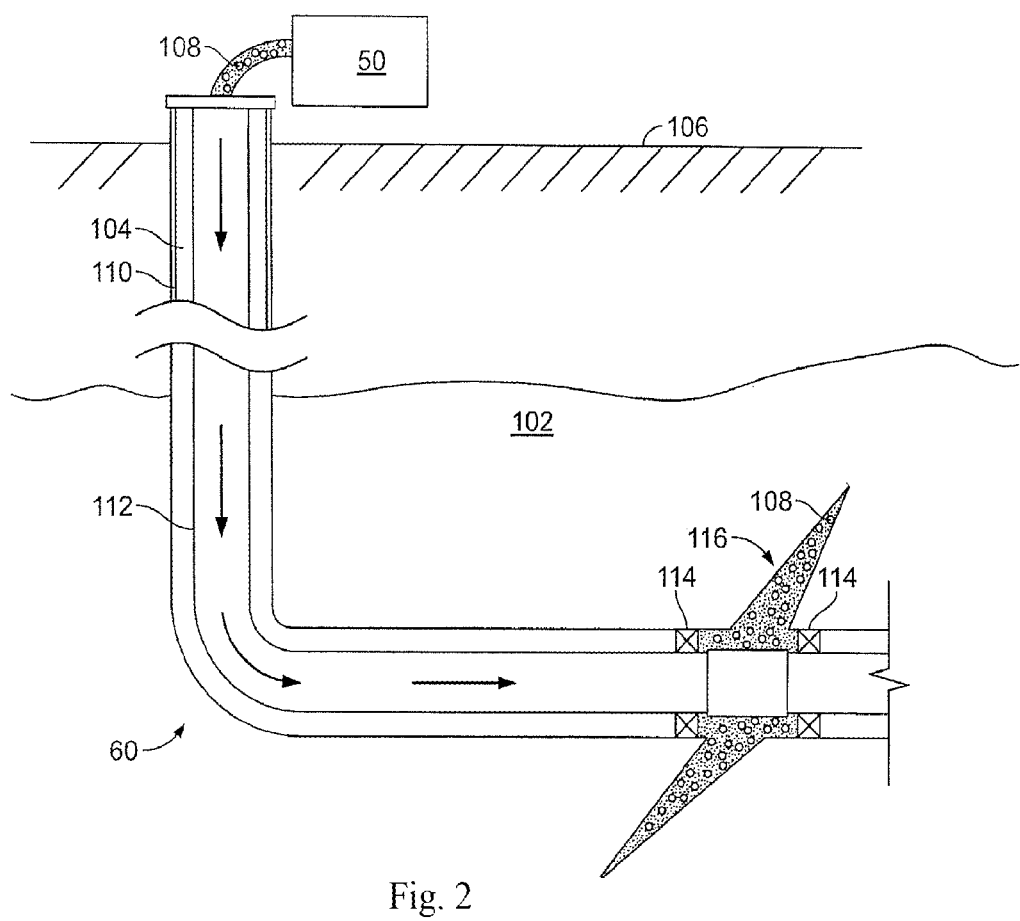
FIG. 2 is a diagram illustrating a well system in which a fracturing operation can be performed.

The following discussion related to FIGS. 1 and 2 pertains to any of the fluids (i.e., the fracturing fluid and the first, second, and third treatment fluids). It should be understood that any discussion related to a "fracturing fluid" is meant to include any of the first, second, or third treatment fluids without the need to continually refer to all of the different types of fluids throughout. The fracturing system 10 of FIG. 1 can include a fluid-producing apparatus 20, a fluid source 30, a proppant source 40, and a pump and blender system 50 and resides at the surface at a well site where a well 60 is located. In certain embodiments, the fluid producing apparatus 20 combines a gel precursor with fluid (e.g., liquid or substantially liquid) from the fluid source 30 to produce a hydrated fluid that is introduced into the subterranean formation. The hydrated fluid can be a fluid for ready use in a fracture stimulation treatment of the well 60 or a concentrate to which additional fluid is added prior to use in a fracture stimulation of the well 60. In other instances, the fluid-producing apparatus 20 can be omitted and the fluid sourced directly from the fluid source 30.

The proppant source 40 can include a proppant (including micro-proppant) for combining with the fluid. The system may also include an additive source 70 that provides one or more additives (e.g., gelling agents, weighting agents, and/or other optional additives) to alter the properties of the fluid. This source can also have a hopper for on-the-fly coating of the proppant, or this source can be used to introduce pre-treated or pre-cured resin-coated proppant into a treatment fluid.

The pump and blender system 50 can receive the fluid and combine it with other components, including proppant from the proppant source 40 and/or additional fluid from the additives 70. The resulting mixture may be pumped down the well 60 under a pressure sufficient to create or enhance one or more fractures in a subterranean zone; for example, to stimulate production of fluids from the zone. The fluid-producing apparatus 20, fluid source 30, and/or proppant source 40 can each be equipped with one or more metering devices (not shown) to control the flow of fluids, proppant, and/or other compositions to the pumping and blender system 50. Such metering devices can facilitate the pumping. The blender system 50 can source from one, some, or all of the different sources at a given time and can facilitate the preparation of fracturing fluids using continuous mixing or on-the-fly methods. Thus, for example, the pumping and blender system 50 can provide just fracturing fluid into the well at some times, just proppant at other times, and combinations of those components at yet other times.

The fluid can be pumped into the subterranean formation. FIG. 2 shows the well 60 during a fracturing operation in a portion of a subterranean formation 102. The subterranean formation can be penetrated by a well. The well can be, without limitation, an oil, gas, or water production well, an injection well, or a geothermal well. The well can also be an offshore well. The well includes a wellbore 104. The wellbore 104 extends from the surface 106, and a fracturing fluid 108 is introduced into a portion of the subterranean formation 102. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting, and/or other tools.

The well is shown with a work string 112. The pump and blender system 50 can be coupled to the work string 112 to pump the fracturing fluid 108 into the wellbore 104. The work string 112 can include coiled tubing, jointed pipe, and/or other structures that allow fluid to flow into the wellbore 104. The work string 112 can include flow control devices, bypass valves, ports, and/or other tools or well devices that control the flow of fluid from the interior of the work string 112 into the subterranean formation 102. For example, the work string 112 can include ports (not shown) located adjacent to the wellbore wall to communicate the fracturing fluid 108 directly into the subterranean formation 102, and/or the work string 112 can include ports that are spaced apart from the wellbore wall to communicate the fracturing fluid 108 into an annulus that is located between the outside of the work string 112 and the wall of the wellbore.

The well system can include one or more sets of packers 114 that create one or more wellbore intervals. The methods also include creating or enhancing one or more fractures within the subterranean formation using the fracturing fluid or the first treatment fluid. When the fracturing fluid 108 or the first treatment fluid is introduced into the wellbore 104 (e.g., in FIG. 2, the wellbore interval located between the packers 114) at a sufficient hydraulic pressure, one or more fractures 116 can be created in the subterranean formation 102.

Figure 3A:
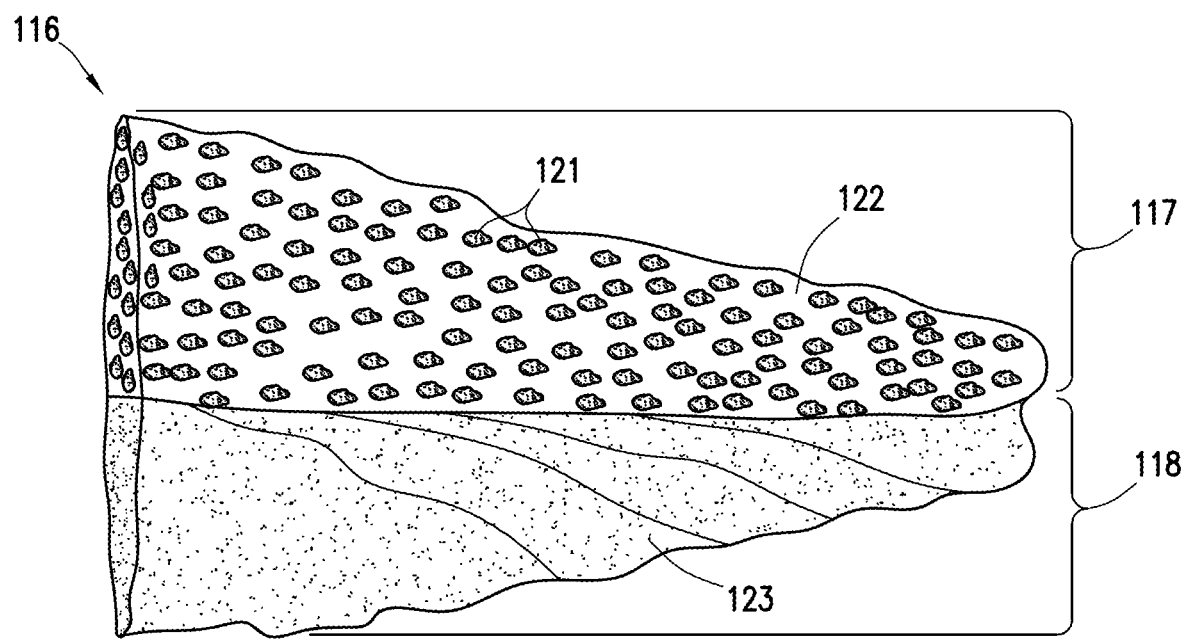
FIGS. 3A and 3B are side view and cross-sectional view illustrations, respectively, showing a fracture including a bottom portion and a top portion.
Figure 3B:
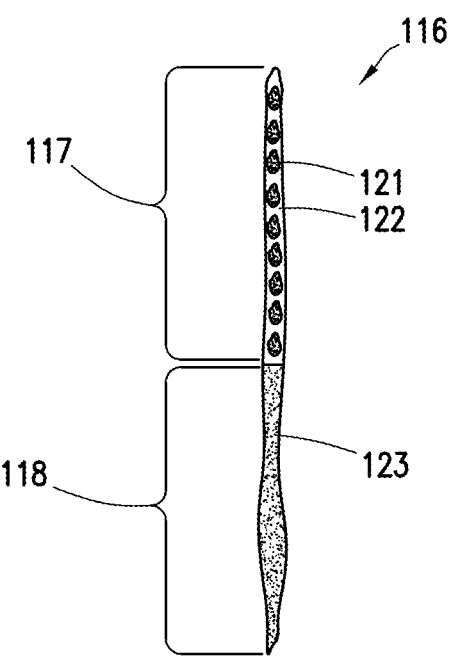

As can be seen in FIGS. 3A and 3B, the fracture 116 includes a bottom portion 118 and a top portion 117. The fracture can also include a middle portion (not shown) as well as other portions not specifically disclosed. The bottom portion 118 and the top portion 117 do not have to have the same dimensions or area. By way of example, the height of the bottom portion can be greater than the height of the top portion. Moreover, the length of the bottom and top portions can be the same or different. The volume of the bottom and top portions can also be the same or different. It should be understood that the bottom portion and the top portion can be partially defined by the portion of the first and second treatment fluids that remain in the bottom and top portion. For example, if the first treatment fluid contains proppant, then the proppant can be the portion of the first treatment fluid that remains in the bottom portion of the fracture. The settling of the proppant along with the volume of proppant introduced into the fracture can define the dimensions of the bottom portion. It should also be understood that the relative terms "bottom" and "top" are used herein for convenience and are defined as the bottom portion being located farther away from the earth's surface compared to the top portion.

The fracturing fluid and the first, second, and third treatment fluids can include a base fluid. As used herein, the term "base fluid" means the liquid that is in the greatest concentration and is the solvent of a solution or the continuous phase of a heterogeneous fluid. The base fluid can include water. The water can be selected from the group consisting of fresh water, brackish water, sea water, brine, produced water—as it is or processed, and any combination thereof in any proportion. The fracturing fluid and the first, second, and third treatment fluids can also include water-miscible liquids, hydrocarbon liquids, and gases.

The fracturing fluid and the first, second, and third treatment fluids can also contain various other additives. The other additives can include, for example, silica scale-control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, particulate diverters, salts, acids, fluid-loss-control additives, gas, catalysts, clay control agents, dispersants, flocculants, scavengers (e.g., $H_2S$ scavengers, $CO_2$ scavengers, or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, and delayed-release breakers.

The first treatment fluid is introduced into the fracture 116. According to certain embodiments where the fracturing fluid creates or enhances the fracture, the first treatment fluid is introduced after introduction of the fracturing fluid. After introduction of the first treatment fluid, at least a portion of the first treatment fluid 123 remains in the bottom portion 118 of the fracture 116.

The first treatment fluid can be a cement composition. As used herein, a "cement composition" is a mixture of at least cement and water that develops compressive strength or sets. A cement composition is generally a slurry in which the water is the external phase of the slurry and the cement (and any other insoluble particles) is the internal phase. The external phase of a cement composition can include dissolved solids. As used herein, the word "cement" means a binder, which is a dry substance that develops compressive strength and can set and can bind other materials together when mixed with water. As used herein, the term "set," and all grammatical variations thereof, means the process of developing compressive strength and becoming hard or solid via curing. The cement can be Class A cement, Class C cement, Class G cement, Class H cement, and any combination thereof. The cement can be, without limitation, Portland cement, gypsum cement, Joppa cement, Dyckerhoff cement, slag cement, high-aluminate cements (such as calcium-aluminate cements and calcium-magnesia cements), and any combination thereof. When a cement composition is the first treatment fluid, a portion of, or a majority of, the cement composition 123 remains in the bottom portion 118 of the fracture 116. The cement composition can then set within the bottom portion 118. According to certain embodiments, the cement composition begins to develop a sufficient compressive strength after introduction into the fracture such that introduction of the second and third treatment fluids do not substantially displace the cement composition from remaining in the bottom portion of the fracture. In this manner, the cement composition can set within the bottom portion and help define the bottom portion's dimensions.

The first treatment fluid can also include the base fluid and insoluble particles (i.e., proppant). The insoluble particles can be selected from the group consisting of nut shells, sand, ceramics, natural sand, quartz sand, particulate garnet, metal particulates, glass, nylon pellets, bauxite and other ores, polymeric materials, and combinations thereof in any proportion. The insoluble particles can be substantially spherical in shape, fibrous materials, polygonal shaped (such as cubic), irregular shapes, and any combination thereof. According to certain embodiments, the quality of the particles, such as sand, can be a lower quality than is normally used in fracturing operations. This lower quality can decrease the costs associated with the operation. A lower quality can be used because it is not necessary to have a high permeability in the bottom portion of the fracture. Moreover, the shape, size, and dimensions of the particles do not have to be selected to provide a high permeability in the bottom portion, which can also decrease costs.

The portion of the first treatment fluid 123 that remains in the bottom portion can be some or a majority of the particles. Accordingly, the base fluid of the first treatment fluid can flow out of the fracture, leaving the particles remaining in the bottom portion. The concentration of particles can be selected to define the dimensions of the bottom portion 118 of the fracture 116. According to certain embodiments, the particles are allowed to settle due to the force of gravity or closure stresses from the formation, for example. The settled particles can also define the dimensions of the bottom portion of the fracture. The insoluble particles for the first treatment fluid can have less than or equal to 90% crush resistance (i.e., at least 10% of the particles crush) at the bottomhole temperature and pressure of the subterranean formation. According to certain embodiments, the insoluble particles for the first treatment fluid can have less than or equal to 50% crush resistance (i.e., at least 50% of the particles crush) at the bottomhole temperature and pressure of the subterranean formation. In this manner, the particles can crush and more tightly pack the bottom portion of the fracture, thereby reducing the permeability in the bottom portion.

After the cement composition develops compressive strength or the particles settle in the bottom portion, an arch can form above the bottom portion of the fracture. This arch can provide a highly conductive channel for fluid flow.

The particles of the first treatment fluid can be coated with a curable resin or tackifying agent. The curable resin or tackifying agent can cause the particles that remain in the bottom portion from undesirably becoming dislodged from the bottom portion of the fracture.

The methods include simultaneously introducing a second treatment fluid and a third treatment fluid into the fracture after the introduction of the first treatment fluid. After introduction of the second and third treatment fluids, at least a portion of the second treatment fluid remains in the top portion 117 of the fracture 116. According to certain embodiments, the second treatment fluid can include a base fluid and insoluble particles. The insoluble particles can be selected from the group consisting of nut shells, sand, ceramics, natural sand, quartz sand, particulate garnet, metal particulates, glass, nylon pellets, bauxite and other ores, polymeric materials, and combinations thereof in any proportion. The insoluble particles can be substantially spherical in shape, fibrous materials, polygonal shaped (such as cubic), irregular shapes, and any combination thereof. According to certain embodiments, the quality of the particles, such as sand, can be a lower quality than is normally used in fracturing operations. This lower quality can decrease the costs associated with the operation. The particles can form aggregates 121 within the base fluid. The aggregates can include from about 2 to several hundred individual particles.

The particles of the second treatment fluid can also be coated with a curable resin or tackifying agent. The curable resin or tackifying agent can help aggregate the particles together and keep the aggregates from breaking apart. The curable resin for any of the insoluble particles (i.e., as part of the first and second treatment fluids) can be part of a curing resin system. The curable resin can be any compound that is capable of curing (i.e., the process of gaining compressive strength and becoming hard). Preferably, the curable resin cures via a chemical reaction with a curing agent. The curable resin can coat the particles prior to or during introduction of the first and/or second treatment fluids into the subterranean formation. The curable resin can also chemically bond with the surfaces of the particles. According to certain embodiments, the curable resin is an epoxy, diepoxy, polyepoxy resin, phenol-formaldehyde, or furan-based resin. For example, the curable resin can be bisphenol A glycidyldiepoxy, glycidyl propyltrimethoxysilane. The curable resin can be in a concentration in the range of about 0.1% to about 10% by weight of the resin system.

The third treatment fluid can include a base fluid. According to certain embodiments, the third treatment fluid does not include insoluble particles, and can be called a proppant-free fluid.

The second treatment fluid and the third treatment fluid can also include a viscosifier. The viscosifier can be selected from the group consisting of an inorganic viscosifier, fatty acids, and combinations thereof. Commercially available examples of a suitable viscosifier include, but are not limited to, RHEMOD L®, TAU-MOD®, RM-63™, and combinations thereof, marketed by Halliburton Energy Services, Inc. The viscosifier can be in a concentration in the range of about 0.1% to 3% by weight of the base fluid. The viscosifier can increase the viscosity of the fluid and can also cause the second treatment fluid and/or third treatment fluid to become a gelled fluid. The viscosifier can suspend the insoluble particles, and can also help aggregate the particles together and suspend the aggregates in the base fluid of the second treatment fluid.

The second and third treatment fluids are simultaneously introduced into the fracture. The second and third treatment fluids can be introduced through different tubing strings, coiled tubing, or annuli. By way of example, the second treatment fluid can be introduced through a coiled tubing while the third treatment fluid can be introduced through an annulus located between the outside of a tubing string and the inside of a casing string. The second and third treatment fluids can mix together prior to or during introduction into the fracture 116. The proppant-free third treatment fluid can surround the aggregates of particles from the second treatment fluid and help separate the aggregates from one another; for example, as depicted in FIG. 3A. After placement in the top portion 117 of the fracture 116, the third treatment fluid can cause the particles and/or particle aggregates to build upon each other to form columns within the top portion; for example, as depicted in FIG. 3B.

The methods can further include introducing a breaker for breaking the viscosity or gel of the second and/or third treatment fluids. The breaker can be introduced after the second and third treatment fluids. The breaker can reduce the viscosity of the second and/or third treatment fluids such that the base fluid can flow from the fracture and into the wellbore or subterranean formation. The breaker can be selected from the group consisting of enzyme breakers, oxidizers (including at least one member selected from the group consisting of ammonium; sodium or potassium perfsulfate; sodium peroxide; sodium chlorite; sodium, lithium, or calcium hypochlorite; chlorinate lime; potassium perphosphate; sodium perborate; magnesium monoperoxyphthalate hexahydrate; organic chlorine derivatives such a N,N'-dichloro dimethyl hydantion and N-chlorocyanuric acid; and salts of any of the foregoing), chitosan, metal bromate, calcium oxide, calcium hydroxide, sodium carbonate, an amine, an acid, or a peroxide. The breaker can also be provided as an encapsulated compound. According to certain embodiments, after the second and/or third treatment fluids are broken, the particles or particle aggregates are the portion of the second treatment fluid that remain in the top portion 117 of the fracture 116. During and after the fluids are broken, the closure stress from the formation can help keep the particles or particle aggregates within the top portion of the fracture.

As discussed previously, the particles can be coated with a curable resin. A curing agent can also be introduced into the fracture. The curing agent can be included within the first, second, and/or third treatment fluids. The curing agent can also be introduced after the first, second, and third treatment fluids have been introduced into the fracture. The curing agent can be introduced with a fluid that also includes the breaker. The curing agent can cause the curable resin to cure. The curing agent can be a dimer acid, a dimer diamine, or a trimer acid. The curing agent can be in a concentration in the range of about 0.1% to about 60% by weight of the resin system. The curing agent can also be in a ratio of about 1:10 to about 10:1 by volume of the curable resin. If the first treatment fluid includes particles, then the curing agent can cause a top layer of the curable-resin-coated particles to cure. In other words, it is not necessary for all of the particles remaining in the bottom portion of the fracture to cure, but rather, it may be desirable for just a top layer to cure in order to cause the particles to remain in the bottom portion and not become dislodged and flow out of the fracture. Moreover, the permeability of the bottom portion may be so low that it is not possible for the curing agent to penetrate through the entire area of particles located in the bottom portion. The curing agent can also keep the particles or particle aggregates of the second treatment fluid from becoming dislodged and flowing out of the top portion of the fracture. Of course, the curable resin can cure via heat, in which case it may not be necessary to introduce a curing agent.

After introduction of the first, second, and third treatment fluids, the bottom portion of the fracture has a first permeability and the top portion of the fracture has a second permeability. The first permeability can be the permeability during and/or after the cement composition has set or after the particles of the first treatment fluid have settled and/or the curable resin has cured. The second permeability can be the permeability after the second and/or third treatment fluids have been broken by the breaker. The first permeability is less than the second permeability. As used herein, the phrase "less than" means a value that is at least 20% less than another value. According to certain embodiments, the first permeability is less than 10 darcy (9.9 micrometers$^2$). According to certain other embodiments, the first permeability is 0. The second permeability can be greater than 13 darcy (12.8 micrometers$^2$). According to certain embodiments, the first permeability is at least 50% less than the second permeability. As can be seen in FIGS. 3A and 3B, highly permeable channels 122 can exist within the top portion 117 of the fracture 116. These highly permeable channels can increase the permeability and flow rate of a fluid through the top portion of the fracture.

Using Darcy's law, a higher flow rate through the top portion of the fracture can be obtained by creating the highly permeable channels and a negligible permeability in the bottom portion compared to traditional proppant packs. This higher flow rate can also be accomplished even when the bottom portion of the fracture comprises 50% to 80% of the total fracture area. Traditionally, it has been thought that forming a conventional proppant pack in the entire fracture was needed to establish desirable fluid flow rates through the fracture. However, the embodiments disclosed herein provide equivalent flow rates compared to traditional proppant packs with a significantly less (e.g., $\frac{1}{120}$) height and holding fracture length and width constant. As such, a traditional proppant-packed fracture would require a height of 120 inches; whereas, the embodiments disclosed herein would have the same flow rate when the top portion of the fracture had a height of only 1 inch. The ability to reduce the total amount of proppant particles according to these embodiments, along with the ability to use lower quality particles, means that the costs of performing a fracturing operation can be significantly reduced. The methods disclosed herein can also increase the conductivity life of the fracture.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example: any transport vessels, conduits, pipelines, trucks, tubulars, and/or pipes used to fluidically move the fluids and additives from one location to another; any pumps, compressors, or motors (e.g., topside or downhole) used to drive the fluids and additives into motion; any valves or related joints used to regulate the pressure or flow rate of the fluids; and any sensors (i.e., pressure and temperature), gauges, and/or combinations thereof. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of fracturing a subterranean formation comprising:
    introducing a fracturing fluid into the subterranean formation, wherein the introduction of the fracturing fluid creates or enhances a fracture in the subterranean formation, and wherein the fracture comprises a bottom portion and a top portion;
    introducing a first treatment fluid into the fracture after introduction of the fracturing fluid, wherein the first treatment fluid comprises first insoluble particles and a first base fluid, wherein the first base fluid is flowed out of the fracture and at least a portion of the insoluble particles are allowed to settle out within the bottom portion of the fracture,
        wherein the first treatment fluid is a cement composition; and
    simultaneously introducing a second treatment fluid and a third treatment fluid into the fracture after introduction of the first treatment fluid, wherein after introduction of the second and third treatment fluids at least a portion of the second treatment fluid remains in the top portion of the fracture, wherein the second treatment fluid comprises second insoluble particles,
        wherein after introduction of the first, second, and third treatment fluids, the bottom portion of the fracture has a first permeability and the top portion of the fracture has a second permeability, and wherein the first permeability is less than the second permeability,
        wherein the first insoluble particles and the second insoluble particles prop the top portion and the bottom portion of the fracture open under closure stress.

2. The method according to claim 1, wherein a portion of or a majority of the cement composition remains in the bottom portion of the fracture.

3. The method according to claim 2, wherein the cement composition that remains in the bottom portion of the fracture sets within the bottom portion of the fracture.

4. The method according to claim 3, wherein the first permeability is the permeability during or after the cement composition has set.

5. The method according to claim 1, wherein the portion of the first treatment fluid that remains in the bottom portion of the fracture is a majority of the particles.

6. The method according to claim 5, wherein the particles that remain in the top portion of the fracture are allowed to settle due to the force of gravity.

7. The method according to claim 6, wherein the particles have less than or equal to 90% crush resistance at the bottomhole temperature and pressure of the subterranean formation.

8. The method according to claim 5, wherein the particles are coated with a curable resin or tackifying agent.

9. The method according to claim 8, wherein the first permeability is the permeability after the particles have settled, the curable resin has cured, or both after the particles have settled and the curable resin has cured.

10. The method according to claim 1, wherein the second treatment fluid further comprises a second base fluid.

11. The method according to claim 10, wherein the second insoluble particles form aggregates within the second base fluid.

12. The method according to claim 10, wherein the insoluble particles are coated with a curable resin or tackifying agent.

13. The method according to claim 1, wherein the third treatment fluid comprises a third base fluid and does not include insoluble particles.

14. The method according to claim 11, wherein the second treatment fluid and the third treatment fluid further comprise a viscosifier.

15. The method according to claim 14, wherein the viscosifier increases the viscosity of the second and third treatment fluids or causes the second and third treatment fluids to become a gelled fluid.

16. The method according to claim 15, further comprising introducing a breaker for breaking the viscosity or gel of the second and third treatment fluids after introduction of the second and third treatment fluids.

17. The method according to claim 16, wherein after the second and third treatment fluids are broken, the particles or particle aggregates are the portion of the second treatment fluid that remains in the top portion of the fracture.

18. The method according to claim 17, wherein the second permeability is the permeability after the second and third treatment fluids have been broken by the breaker.

19. The method according to claim 1, wherein the second and third treatment fluids are introduced into the fracture through different tubing strings, coiled tubing, or annuli.

20. The method according to claim 1, wherein the first permeability is less than 10 darcy.

21. The method according to claim 1, wherein the first permeability is at least 50% less than the second permeability.

22. The method according to claim 1, wherein the fracturing fluid is introduced into the subterranean formation and the first, second, and third treatment fluids are introduced into the fracture using one or more pumps.

23. A method of fracturing a subterranean formation comprising:
    introducing a first treatment fluid into the fracture, wherein the introduction of the first treatment fluid creates or enhances a fracture in the subterranean formation, wherein the fracture comprises a bottom portion and a top portion, wherein the first treatment fluid comprises first insoluble particles and a first base fluid, and wherein the first base fluid is flowed out of the fracture and at least a portion of the first insoluble particles are allowed to settle out within the bottom portion of the fracture,
        wherein the first treatment fluid is a cement composition; and
    simultaneously introducing a second treatment fluid and a third treatment fluid into the fracture after introduction of the first treatment fluid, wherein after introduction of the second and third treatment fluids, at least a portion of the second treatment fluid remains in the top portion of the fracture, wherein the second treatment fluid comprises second insoluble particles, wherein after introduction of the first, second, and third treatment fluids, the bottom portion of the fracture has a first permeability and the top portion of the fracture has a second permeability, and wherein the first permeability is less than the second permeability, wherein the first insoluble particles have a crush resistance of about 50% or less;

wherein the first insoluble particles and the second insoluble particles prop the top portion and the bottom portion of the fracture open under closure stress.

* * * * *